R. J. Jordan,
Steam-Boiler Water-Feeder,
No. 69,218. Patented Sep. 24, 1867.
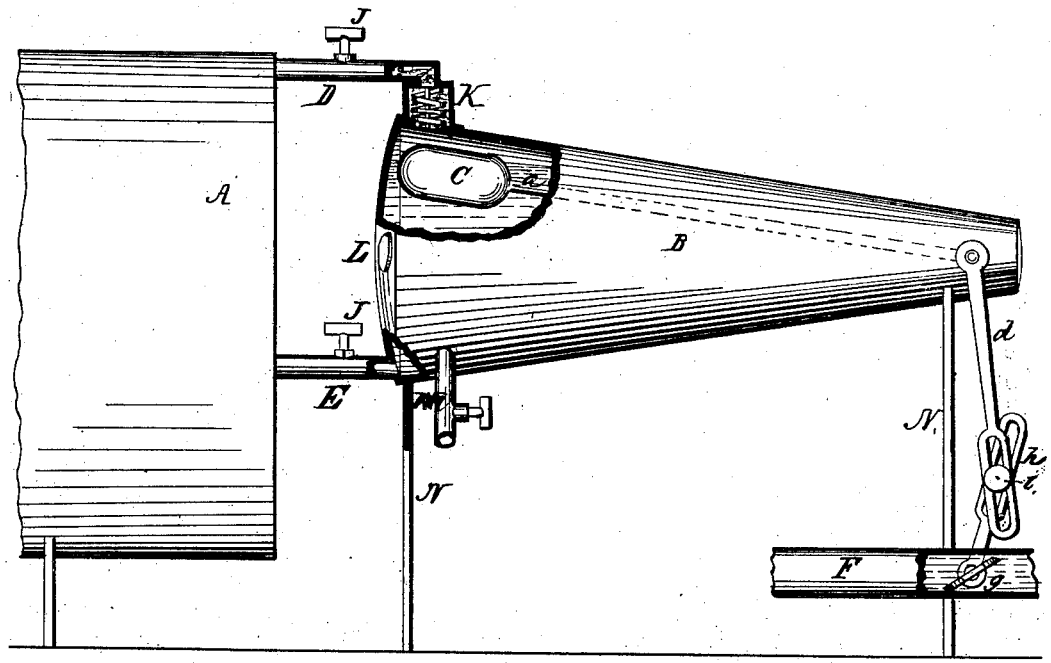
Witnesses:
Theo Fusche
J. Addison Fraser
Inventor:
R. J. Jordan
Per Munn & Co.
Attys.

United States Patent Office.

R. J. JORDAN, OF ELKHART, INDIANA, ASSIGNOR TO HIMSELF AND E. DARLING, OF THE SAME PLACE.

Letters Patent No. 69,218, dated September 24, 1867.

IMPROVEMENT IN BOILER-WATER REGULATORS.

*The Schedule referred to in these Letters Patent and making part of the same.*

TO ALL WHOM IT MAY CONCERN:

Be it known that I, R. J. JORDAN, of Elkhart, in the county of Elkhart, and State of Indiana, have invented a new and improved Water-Regulator for Steam-Boilers; and I do hereby declare that the following is a full, clear, and exact description thereof, which will enable those skilled in the art to make and use the same, reference being had to the accompanying drawings, forming part of this specification.

This invention relates to a new and improved method of regulating the quantity of water which is discharged into a steam-boiler by the force-pump; and it consists in operating a valve in the pipe which conveys the water to the force-pump by a float in a reservoir, which reservoir is in communication with the steam-boilers, as will be hereinafter described.

The drawing represents a longitudinal view of the arrangement, (partly in section,) showing the reservoir, with its attachments and a portion of the steam-boiler.

Similar letters of reference indicate corresponding parts.

A is the steam-boiler. B is the reservoir. C represents a float in the reservoir. The reservoir is a cone-shaped cylinder, placed in a horizontal position, as represented in the drawing. D is a pipe which connects the reservoir with the steam-space, and E is a pipe which connects it with the water-space of the boiler. The water in the reservoir, it will be seen, will stand at all times on a level with the water in the boiler, and the float C will rise and fall with the water. This float is attached to the end of a rod, which is represented in dotted lines and section, as seen at $a$. The other end of this rod is attached to a small shaft, which is placed transversely in the reservoir, the end of which is seen at $c$. This shaft $c$ is partly rotated by the rise and fall of the float, and thereby imparts motion to a lever, $d$, which is attached to the end of it, as seen in the drawing. F represents the water pipe, and $g$ is a valve in the water pipe. This valve is attached to a spindle which passes through the pipe, and $h$ is a lever which is attached to the spindle. Both the levers $d$ and $h$ are slotted, which allows them to be adjustable by a screw-bolt, $i$, as seen in the drawing. By connecting the two levers $d$ and $h$ in this manner, the float will open or close the valve $g$ as it falls or rises, and the quantity of water which is allowed to pass through the pipe to the force-pump will be regulated accordingly. J J are cocks, by which the steam and water may be shut off from the reservoir when desired. K is a small turret on the reservoir, to which the steam pipe D is attached, and within the turret there is a coil of copper wire, with one end turned down through the coil. This arrangement is for the purpose of preventing incrustation in the reservoir. L represents a hand-hole in the large end of the reservoir, for the purpose of cleaning it when necessary. $m$ is a waste pipe, with cock attached, for drawing off the water from the reservoir when desired.

The reservoir is made of proper size, and of sufficient strength to stand the boiler pressure. It is supported in its proper position by stands, which are marked N N in the drawing.

Having thus described my invention, I claim as new, and desire to secure by Letters Patent—

1. The arrangement of the reservoir B, float C, rod $a$, valve $g$, levers $d$ $h$, with reference to the steam-generator, substantially as shown and described.

2. The combination of the reservoir B with the turret K and wire coil, substantially as described.

R. J. JORDAN.

Witnesses:
  N. F. BRODRICK,
  GEO. W. BEST.